United States Patent

Knapp et al.

[11] Patent Number: 5,967,918
[45] Date of Patent: Oct. 19, 1999

[54] REGULATING SYSTEM FOR A CONTINUOUSLY VARIABLE TRANSMISSION (CVT)

[75] Inventors: Thomas Knapp, Karlstein; Wolfgang Danz, Friedrichshafen, both of Germany

[73] Assignee: ZF Friedrichshafen AG, Friedrichshafen, Germany

[21] Appl. No.: 09/117,424

[22] PCT Filed: Feb. 15, 1997

[86] PCT No.: PCT/EP97/00723

§ 371 Date: Jul. 29, 1998

§ 102(e) Date: Jul. 29, 1998

[87] PCT Pub. No.: WO97/31200

PCT Pub. Date: Aug. 28, 1997

[30] Foreign Application Priority Data

Feb. 21, 1996 [DE] Germany ............... 196 06 311

[51] Int. Cl.[6] ............ F16H 59/00; F16H 61/00; B60K 41/04; H02P 1/00
[52] U.S. Cl. ............... 474/28; 474/70; 477/45; 318/491
[58] Field of Search ............... 474/8, 11, 12, 474/16, 18, 28, 69, 70; 180/175, 176, 177, 178, 179; 318/491, 540; 477/37, 38, 42, 44, 45, 50

[56] References Cited

U.S. PATENT DOCUMENTS

| 4,743,223 | 5/1988 | Tokoro et al. ............... 474/69 |
|---|---|---|
| 4,989,149 | 1/1991 | Mimura et al. ............... 364/426.04 |
| 5,310,384 | 5/1994 | Siemon ............... 474/70 |
| 5,334,102 | 8/1994 | Sato ............... 474/70 |
| 5,364,321 | 11/1994 | Togai et al. ............... 477/42 |
| 5,366,416 | 11/1994 | Roovers et al. ............... 474/70 |
| 5,720,692 | 2/1998 | Kashiwabara ............... 474/28 |
| 5,725,447 | 3/1998 | Friedmann et al. ............... 474/28 |
| 5,762,576 | 6/1998 | Aoki et al. ............... 474/28 |
| 5,766,105 | 6/1998 | Fellows et al. ............... 474/28 |
| 5,776,028 | 7/1998 | Matsuda et al. ............... 474/28 |

FOREIGN PATENT DOCUMENTS 0 140 228 A1 5/1985 European Pat. Off. .
0 565 144 A1 10/1993 European Pat. Off. .

OTHER PUBLICATIONS

JP 62–125923 A Abstract, Section M, vol. 11, No. 347, dated Nov. 13, 1987.

JP 01–052535 A Abstract, Section M, vol. 13, No. 244, dated Jun. 7, 1989.

JP 01–074132 A Abstract, Section M, vol. 13, No. 281, dated Jun. 27, 1989.

*Primary Examiner*—Tamara L. Graysay
*Assistant Examiner*—Matthew A. Kaness
*Attorney, Agent, or Firm*—Davis & Bujold

[57] ABSTRACT

For a CVT (3) a regulating system is proposed in which a corrector is located upstream of the control path. The disturbances and non-linearities in the control path (28) are taken into account in the corrector, via a mathematical model, so that the regulator can be designed as a simple PID regulator.

3 Claims, 2 Drawing Sheets

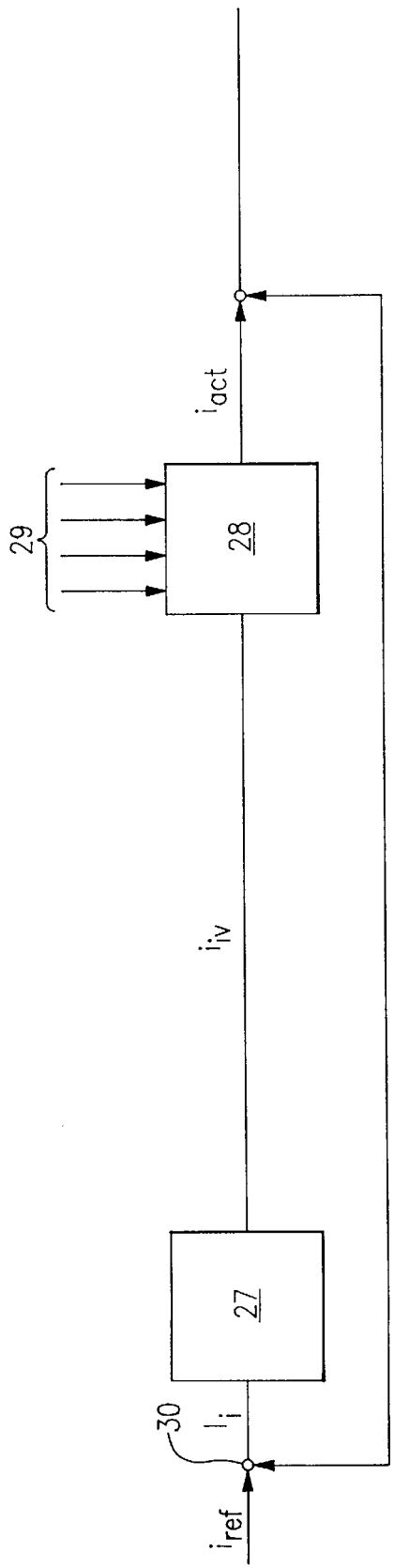
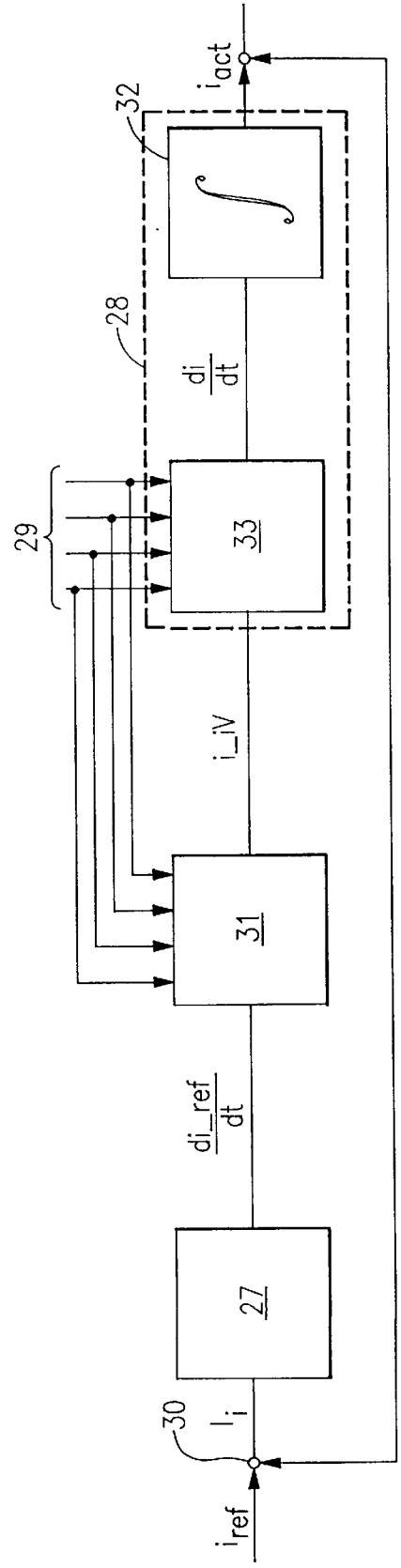
FIG.2
FIG.3

REGULATING SYSTEM FOR A CONTINUOUSLY VARIABLE TRANSMISSION (CVT)

The invention concerns a regulating system for a CVT of the cone-disc continuously variable type in which the variator corresponds to the control path and the ratio is regulated.

BACKGROUND OF THE INVENTION

Continuously variable automatic transmissions (hereinafter called "CVT") are comprised of the following units: a start unit, a forward/reverse gear unit, a variator, an intermediate shaft, a differential, and hydraulic and electronic control devices. The variator, in turn, is comprised of a first cone disc pair disposed on the input side and having a hydraulic adjustment unit, a second cone disc pair disposed on the output side and having a hydraulic adjustment unit and a continuously variable part which moves between the cone disc pairs. The first cone disc pair comprises one cone disc, stationary in an axial direction, and one movable cone disc. The movable cone disc placed on the input side is hereinafter designated as the primary disc. The second cone disc pair likewise comprises a cone disc, stationary in an axial direction, and one movable cone disc. The cone disc situated on the output side is hereinafter designated as the secondary disc. The axial position of the primary disc here determines the moving radius of the continuously variable part and thus the ratio of the CVT. The axial position of the secondary disc determines the contact pressure of secondary disc/continuously variable part and thus the capacity for torque transmission. The primary and secondary discs are adjusted by the pressure level in the respective hydraulic adjustment units. These pressure levels are determined by the electronic control device with the aid of an electromagnetic pressure regulator, which is in the hydraulic control device. In such a CVT, the ratio is usually regulated. The engine performance desired by a driver, or the ratio or pressure level, for example, are selected as set point variables. In connection with this a control loop was disclosed in EP-A-0 565 144. In the control loop shown therein, a desired pressure level is a set point variable. The value to be controlled, in turn, corresponds to an actual pressure level. An electromagnetic pressure regulator or the variator represents the control path. The error results from the comparison between the value to be controlled and the set point variable. The error is the input variable for a regulator. Different disturbances act upon the control path, here, the variator. Disturbances are, for example, the speed of the primary and secondary discs, the pressure level in the adjustment space of the secondary disc, and the power ratio of the primary disc to the secondary disc. The later, in turn, is a function of the torque to be transmitted, of the ratio, and of the power of the secondary disc. The disturbances and the existing non-linearities must be compensated for in the regulator. The prior art thus has the disadvantage that a disturbance modulation and a non-linear regulator must be used. These regulator structures are known to be very complex and difficult to tune.

SUMMARY OF THE INVENTION

The problem to be solved by the invention is to provide an easy to tune regulating system for a CVT.

According to the invention, the problem is solved by locating a corrector upstream of the control path. With the corrector, by means of a mathematical model, the non-linearities and disturbances of the control path are compensated for. The regulator is designed herein as a PID regulator.

The solution according to the invention offers the advantage that the regulator resembles an almost linear alternative control path.

In an embodiment of the invention, the pressure level in the adjustment unit of the primary disc is calculated according to the following formula:

$$p1 = [C - d(i)\ (di\_ref/dt)] / A1 \text{ with}$$

$$C = (p2 + K\_R2n2^2)\ A2\ \mu - K\_R1n1^2 \cdot A1$$

which here mean:

| | |
|---|---|
| p2: | pressure level of the second adjustment unit; |
| A2: | active surface of the second adjustment unit; |
| A1: | active surface of the first adjustment unit |
| $\mu$: | power ratio of primary disc to secondary disc (kp/ks) |
| d(i): | ratio-dependent parameter; |
| di_ref/dt: | reference value gradient of the change of ratio; |
| n1: | speed of primary disc; |
| n2: | speed of secondary disc, |
| K-R1: | rotatory pressure coefficient of primary disc; |
| K_R2: | rotatory pressure coefficient of secondary disc. |

Furthermore, in a quick downshift to LOW (i=iMAX) the calculated pressure level of the adjustment space of the primary disc is set to zero (p1=0) in case the above value is calculated as being lower than 0 bar. The reference value for the pressure level of the adjustment space of the secondary disc p2 is then calculated according to the following formula:

$$p2\_ref = [d(i)\ (di\_ref/dt) + A1K\_R1n1^2] / A2\ \mu - K\_R2n2^2$$

with:

| | |
|---|---|
| A2: | active surface of the second adjustment unit; |
| $\mu$: | power ratio of primary disc to secondary disc (kp/ks) |
| d(i): | ratio-dependent parameter; |
| di_ref/dt: | reference value gradient of the change of ratio; |
| n1: | speed of primary disc; |
| n2: | speed of secondary disc; |
| K-R1: | rotatory pressure coefficient of primary disc; |
| K_R2: | rotatory pressure coefficient of secondary disc. |

A quick downshift to LOW must take place, for example, in a blocking braking.

In another development of the invention, in a quick upshift to OVERDRIVE (i−iMIN), the calculated pressure level of the adjustment space of the primary disc is set equal to the system pressure (p1=pS) in the event that the calculated pressure p1 is higher than the system pressure (p1>p2). The reference value for the pressure level of the system pressure is then calculated according to the following formula:

$$pS\_ref = [C - (d(i)\ di\_ref/dt)] / A1$$
$$C = [p2 + K\_R2n2^2] + A2 + \mu - K\_R1n1^2 A1 \text{ with:}$$

-continued

| | |
|---|---|
| A2: | active surface of the second adjustment unit; |
| A1: | active surface of the first adjustment unit; |
| μ: | power ratio of primary disc to secondary disc (kp/ks) ; |
| d(i): | ratio-dependent parameter; |
| di_ref/dt: | reference value gradient of the change of ratio; |
| n1: | speed of primary disc; |
| n2: | speed of secondary disc; |
| K-R1: | rotatory pressure coefficient of primary disc; |
| K_R2: | rotatory pressure coefficient of secondary disc. |

These developments offer the advantage that high adjustment gradients are obtained by the pressure level in the adjustment space of the secondary disc or by the system pressure being regulated accordingly. It is known that with high adjustment gradients it happens that the calculated pressure level in the adjustment space of the primary disc must be negative or higher than the available system pressure.

BRIEF DESCRIPTION OF THE DRAWINGS

An embodiment is shown in the figures which show:

FIG. 2 is a control loop according to the prior art; and

FIG. 3 is a control loop according to the invention.

DESCRIPTION OF THE PREFERRED EMBODIMENTS

Figure 1:
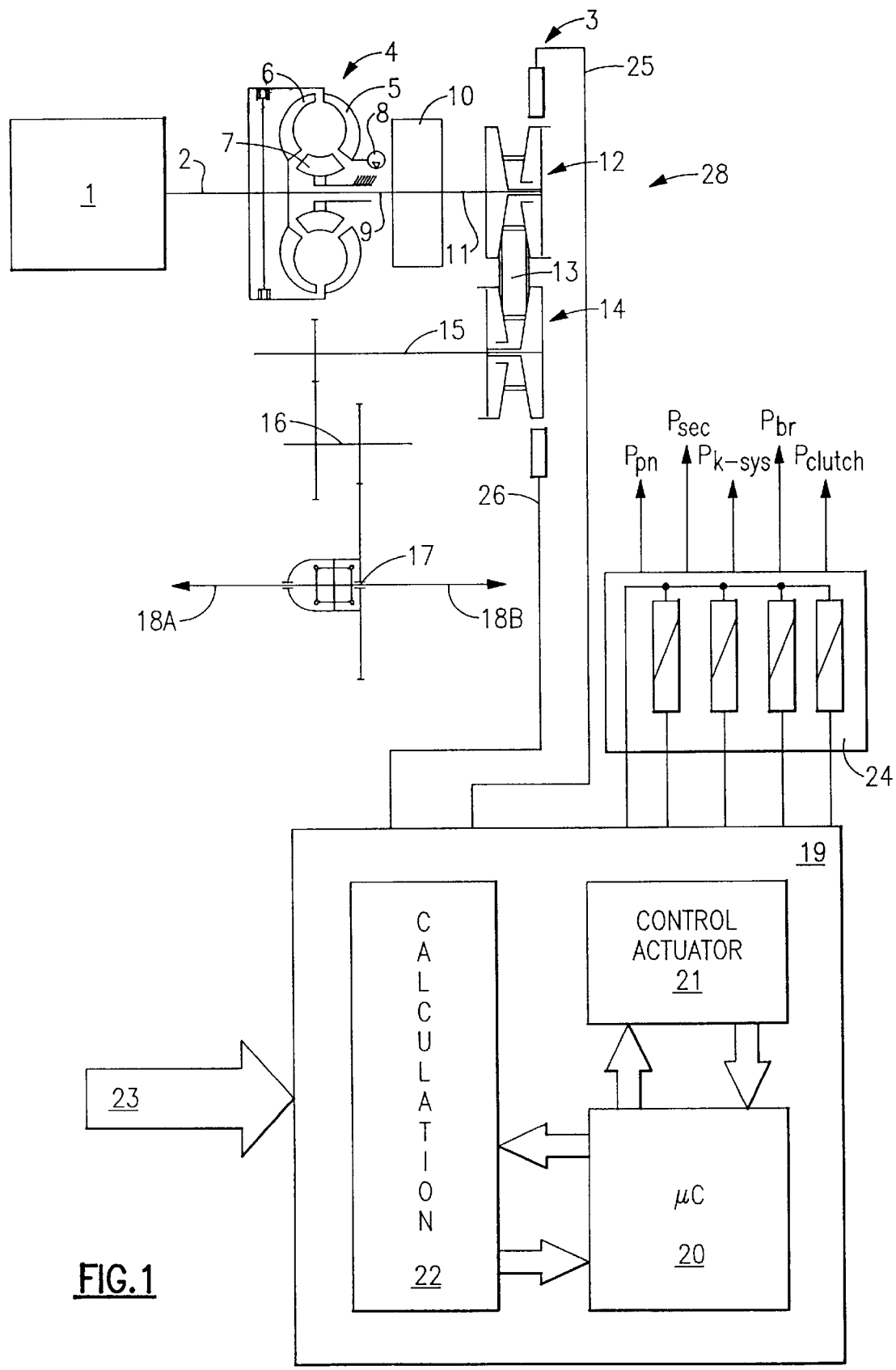
FIG. 1 is a system diagram of a CVT.

FIG. 1 shows a system diagram consisting of an input unit 1 such as an internal combustion engine, a CVT 3, a hydraulic control device 24 and an electronic control device 19. The CVT 3 is actuated by the input unit 1 via an input shaft 2. The input shaft 2 drives a starting unit. In FIG. 1, a hydrodynamic converter 4 is shown as the starting unit. As it is known, the hydrodynamic converter 4 consists of an impeller 5, a turbine wheel 6 and a stator 7. A converter bridge clutch, without a reference numeral, is parallel to the hydrodynamic converter. A pump 8 is connected with the impeller 5 of the hydrodynamic converter 4. The pump 8 conveys the hydraulic medium from a lubricant sump to the actuators of the CVT 3. The turbine wheel 6, or the converter bridge clutch, drives a first shaft 9. The shaft 9, in turn, drives a forward/reverse gear unit 10. The forward/reverse gear unit serves to reverse the direction of rotation. A variable output of the forward/reverse gear unit is via a second shaft 11. The second shaft 11 is connected with a variator 28. The variator 28 consists of a first cone disc pair 12, a second cone disc pair 14 and the continuously variable part 13. The continuously variable part 13 moves between the two cone disc pairs 12 and 14. The first cone disc pair 12 situated on the input side consists of a disc, stationary in the axial direction, and a primary disc. A hydraulic adjustment unit usually designed in a cylinder piston shape is connected with the primary disc. The second cone disc pair situated on the secondary side consists of a cone disc, stationary in the axial direction, and a secondary disc. The secondary disc likewise has a hydraulic adjustment unit. The ratio of the transmission is changed by changing the position of the primary disc. The movement radius of the continuously variable part 13 thereby changes in a manner known per se. The variator 28 is connected with an output shaft 15. An intermediate shaft 16 is connected with the output shaft 15 via a gear pair. The intermediate shaft 16 serves to reverse the direction of rotation and for the adaption of the torque and speed. The intermediate shaft 16 is connected with the differential 17 via a gear pair. Variable outputs for the differential 17 are two axle half shafts 18A and 18B which lead to the input gears of a vehicle (not shown). Since the mechanical part is irrelevant for the understanding of the invention, a more precise description is omitted.

The electronic control device 19 controls the CVT 3 via electromagnetic actuators. As function blocks of the electronic control device 19, the microcontroller 20, a function block control actuator 21, and a calculation function block 22 are shown in very simplified manner. Input variables 23 are connected to the electronic control device 19. Input variable 23 are, for example, the signal of the throttle valve, the signal of the speed of the input unit, the temperature of the hydraulic medium and the pressure level of the secondary disc or the system pressure. The speeds of the primary disc 25 and secondary disc 26 are plotted as added input variables. The microcontroller calculates by means of the function block 22, from the input variables 23 or speeds of the discs 25 and 26, the function parameters for the CVT 3. These are adjusted by means of the function block control actuator 21, via the electromagnetic actuators, which are in the hydraulic control device 24 of the CVT 3. The pressures for the primary disc, the secondary disc, the system pressure and the clutch or brake pressure for the forward/reverse gear unit are shown as function parameters of the CVT 3 or output variables of the hydraulic control device 24.

FIG. 2 shows a simplified control loop according to the prior art. The set point variable here is a reference ratio i_ref, control variable is the self-adjusting ratio i_act. The regulator is shown with reference numeral 27 and the control path, here a variator, with reference numeral 28. From the comparison of set point variable i_ref and control variable i_act at the summation point 30, the control error li results. The regulator 27 now seeks to bring the control error li to zero. The output variable of the regulator 27 is a current value i_iv. The current value is converted to a pressure value via an electromagnetic regulator. The pressure value is the input variable for the control path 28. Disturbances 29 include: the speed of the primary disc, the speed of the secondary disc, the pressure level in the adjustment space of the secondary disc and the power ratio of the primary disc to the secondary disc which, in turn, is a function of the torque to be transmitted, of the ratio, and of the power of the secondary disc. The disturbances and existing non-linearities must be compensated for by a non-linear regulator.

FIG. 3 shows a control loop according to the invention. Between the regulator 27 and the control path 28 is additionally inserted a corrector 31. The control path 28 is divided in two blocks, reference numerals 32 and 33. What has been said with respect to FIG. 2 applies to the set point variable, the control variable, and the control error. The output variable of the regulator 27 is here a reference gradient di_ref/dt. The corrector 31 contains a mathematical model. The output variable of the corrector 31 is, in turn, a current value i_iv. The current value is converted by an electromagnetic pressure regulator to a pressure value for the control path 28. The output variable of the partial control path 33 is the ratio gradient d1/dt. The latter is further guided to the integrator 32. Upon the control path 28 the above described disturbances 29 act which are modulated in the corrector 31. Thus, the effects are minimal as a whole. The mathematical model of the corrector 31 appears as follows:

$p1=[C-d(i)\ (di\_ref/dt)]\ /A1$ with $$C=(p2+K\_R2n2^2)\ A2\ \mu - K\_R1n1^2 \cdot A1$$

which here means:

| | |
|---|---|
| p2: | pressure level of the second adjustment unit; |
| A2: | active surface of the second adjustment unit; |
| A1: | active surface of the first adjustment unit; |
| μ: | power ratio of primary disc to secondary disc (kp/ks); |
| d(i): | ratio-dependent parameter; |
| di_ref/dt: | reference value gradient of the change of ratio; |
| n1: | speed of the primary disc; |
| n2: | speed of the secondary disc; |
| K-R1: | rotatory pressure coefficient of primary disc; |
| K_R2: | rotatory pressure coefficient of secondary disc. |

The ratio-dependent parameter d(i) takes into account the fact that the adjustment speed of the variator does not extend linearly but hyperbolically. Thus, for example, the adjustment speed is less in an adjustment direction OVERDRIVE (i=iMIN) than in an adjustment direction LOW (i=iMAX). The solution, according to the invention, offers the advantage that the regulator resembles an almost linear alternative control path. The regulator can be designed as a PID regulator with constant parameters, To this mathematical model apply two special cases: the first special case is in a quick downshift to LOW. The second special case is in a quick upshift to OVERDRIVE. In the first special case, the calculation results dictate that the pressure level in the adjustment space of the primary disc must be less than 0 bar. In this case, the pressure level is set to 0 bar. Herefrom results the following mathematical equation for the pressure reference value of the disc 2:

$$p2\_ref=[d(i)\ (di\_ref/dt)+A1K\_R1n1^2]\ /A2\ \mu - K\_R2n2^2$$

with:

| | |
|---|---|
| A2: | active surface of the second adjustment unit; |
| μ: | power ratio of primary disc to secondary disc (kp/ks); |
| d(i): | ratio-dependent parameter; |
| di_ref/dt: | reference value gradient of the change of ratio; |
| n1: | speed of the primary disc; |
| n2: | speed of the secondary disc; |
| K-R1: | rotatory pressure coefficient of primary disc; |
| K_R2: | rotatory pressure coefficient of secondary disc. |

In the second special case, the mathematical calculation requires that the pressure level in the adjustment space of the primary disc must be higher than the system pressure. System pressure is the maximum possible pressure made available by the pump such as 50 bar. In this case, the pressure level of the adjustment space of the primary disc is set equal to the pressure level of the system pressure The following mathematical equation results herefrom:

$$pS\_ref = [C - (d(i)\ di\_ref/dt)]\ /A1$$
$$C = [p2 + K\_R2n2^2] + A2 + \mu - K\ R1n1^2A1\ \text{with:}$$

| | |
|---|---|
| A2: | active surface of the second adjustment unit; |
| A1: | active surface of the first adjustment unit; |
| μ: | power ratio of primary disc to secondary disc (kp/ks); |
| d(i): | ratio-dependent parameter; |
| di_ref/dt: | reference value gradient of the change of ratio; |
| n1: | speed of the primary disc; |
| n2: | speed of the secondary disc; |
| K-R1: | rotatory pressure coefficient of primary disc; |
| K_R2: | rotatory pressure coefficient of secondary disc. |

We claim:

1. A regulating system for regulating a ratio (1) of a CVT (3), said regulating system comprising:

an electronic control device (19);

a hydraulic control device (24); and a variator corresponding to a control path (28), said variator (28) having a first cone disc pair (12) situated on an input side of said variator (28) and having a first hydraulic adjustment unit, a second cone disc pair (14) situated on an output side of said variator (28) and having a second hydraulic adjustment unit, and a continuously variable part (13) which moves between said cone disc pairs (12, 14), said first cone disc pair (12) having one cone disc, stationary in a first axial direction, and a primary disc movable in the first axial direction, said second cone disc pair (14) having a cone disc, stationary in a second axial direction, and a secondary disc movable in the second axial direction;

wherein said electronic control device (19) determines control parameters of the CVT (3) from a plurality of input variables (23, 25, 26);

said electronic control device (19), by the hydraulic control device (24) of said first and second adjustment units, via the axial positions of said primary and secondary discs, regulates the ratio (i) and the contact pressure between the cone discs and the continuously variable part;

a regulator (27), using the control error, forms a correcting variable (i_iv) for the control path (28);

a corrector (31) is located upstream of said control path (28), said corrector (31) compensates, via a mathematical model, for any non-linearities and disturbances of said control path (28) and said regulator (27); and the pressure level of said first adjustment unit (p1) is calculated according to the following formula:

$$p1=[C-d(i)\ (d\_ref/dt)]\ /A,\ \text{with}$$

$$C=(p2+K\_R2n2^2)\ A2\ \mu - K\_R1n1^2 \cdot A1$$

where:

| | |
|---|---|
| p2: | pressure level of the second adjustment unit; |
| A2: | active surface of the second adjustment unit; |
| A1: | active surface of the first adjustment unit; |

-continued

| | |
|---|---|
| μ: | power ratio of primary disc to secondary disc (kp/ks); |
| d(i): | ratio-dependent parameter; |
| di_ref/dt: | reference value gradient of the change of ratio; |
| n1: | speed of primary disc; |
| n2: | speed of secondary disc, |
| K-R1: | rotatory pressure coefficient of primary disc; |
| K_R2: | rotatory pressure coefficient of secondary disc, | the speed of the primary disc, the speed of the secondary disc, the pressure level in the adjustment space of the secondary disc, and the power ratio of the primary disc to the secondary disc being the disturbances and the non-linearities.

2. The regulating system of claim 1, wherein upon a quick downshift to LOW (i=iMAX) the pressure level of said first adjustment space is set to zero (p1=0) and the reference value for the pressure level of said second adjustment space (p2_ref) is calculated according to the following formula:

| | |
|---|---|
| p2_ref = [d(i) d_ref/d + A1K_R1n1²]/A2 μ − K_R2n2², with: | |
| A2: | active surface of the second adjustment unit; |
| μ: | power ratio of primary disc to secondary disc (kp/ks); |
| d(i) : | ratio-dependent parameter; |
| d_ref/dt: | reference value gradient of the change of ratio; |
| n1: | speed of primary disc; |
| n2: | speed of secondary disc; |
| K-R1: | rotatory pressure coefficient of primary disc; |
| K_R2: | rotatory pressure coefficient of secondary disc. |

3. The regulating system of claim 1, wherein upon a quick upshift to OVERDRIVE (i=iMIN) the pressure level of said first adjustment space is set equal to the pressure level of the system pressure (p1=pS) and the reference value for the pressure level of the system pressure (pS_ref) is calculated according to the following formula:

| | |
|---|---|
| pS_ref = [C − (d(i) di_ref/dt)] /A1 | |
| C = [p2 + K_R2n2²] • A2 • μ − K_R1n1²A1, | | where:

| | |
|---|---|
| A2: | active surface of the second adjustment unit; |
| A1: | active surface of the first adjustment unit; |
| μ: | power ratio of primary disc to secondary disc (kp/ks); |
| d(i) : | ratio-dependent parameter; |
| d_ref/dt: | reference value gradient of the change of ratio; |
| n1: | speed of primary disc; |
| n2: | speed of secondary disc; |
| K-R1: | rotatory pressure coefficient of primary disc; |
| K_R2: | rotatory pressure coefficient of secondary disc. |

* * * * *